United States Patent
Chou (10) Patent No.: US 6,965,651 B1
(45) Date of Patent: Nov. 15, 2005

(54) METHOD AND APPARATUS FOR DELAY ADJUSTMENT AND CHANNEL REORDERING IN BASEBAND COMMUNICATION RECEIVING SYSTEM

(75) Inventor: Eric Ying-Chin Chou, Fremont, CA (US)

(73) Assignee: Micrel, Inc., San Jose, CA (US)

( * ) Notice: Subject to any disclaimer, the term of this patent is extended or adjusted under 35 U.S.C. 154(b) by 804 days.

(21) Appl. No.: 09/854,405

(22) Filed: May 11, 2001

(51) Int. Cl.[7] .............................................. H03D 1/00
(52) U.S. Cl. ...................................... 375/340; 375/260
(58) Field of Search ......................... 710/71; 341/100, 341/101; 713/503; 714/700, 701, 400, 792, 714/794, 795, 796; 370/518, 539, 100.1, 370/473, 509; 375/316, 341, 260, 288, 262, 375/265, 233, 229, 231, 263, 346; 327/261

(56) References Cited

U.S. PATENT DOCUMENTS

| | | | | |
|---|---|---|---|---|
| 5,408,473 A | * | 4/1995 | Hutchison et al. | 370/506 |
| 5,612,694 A | * | 3/1997 | Jedwab et al. | 341/94 |
| 6,079,035 A | * | 6/2000 | Suzuki et al. | 714/700 |
| 6,226,332 B1 | * | 5/2001 | Agazzi et al. | 375/288 |
| 6,249,544 B1 | * | 6/2001 | Azazzi et al. | 375/233 |
| 6,336,192 B1 | * | 1/2002 | Sakamoto et al. | 713/503 |
| 6,618,395 B1 | * | 9/2003 | Kimmitt | 370/473 |
| 6,675,327 B1 | * | 1/2004 | Mobin et al. | 714/700 |
| 6,678,842 B1 | * | 1/2004 | Shaffer et al. | 714/700 |
| 6,775,302 B1 | * | 8/2004 | Shaffer et al. | 370/518 |

* cited by examiner

Primary Examiner—Jay K. Patel
Assistant Examiner—Jacob Meek
(74) Attorney, Agent, or Firm—Fenwick & West LLP (57) ABSTRACT

Apparatus and method receives and reorders a multi-dimensional signal transmitted through a communication channel using a slicer/encoder coupled to a pair-swap and symbol alignment module. The slicer/encoder uses a code that reduces the number of bits for each symbol in the multidimensional signal as required to pass through the pair-swap and symbol alignment module that detects and corrects pair-swap and symbol misalignment in the multidimensional signal. Decoders reverse the encoding done on the multidimensional signal by the encoder, and correct errors that occurred in the transmission of multidimensional signal over the communication channel. Serialized circuitry and performance of symbol alignment and pair-swap reordering in one pass significantly reduce circuitry and power consumption.

6 Claims, 8 Drawing Sheets

METHOD AND APPARATUS FOR DELAY ADJUSTMENT AND CHANNEL REORDERING IN BASEBAND COMMUNICATION RECEIVING SYSTEM

FIELD OF THE INVENTION

This invention relates generally to delay adjustment and channel re-ordering, and particularly to a method and system for data forwarding, symbol alignment and pair-swap reordering in a base-band communication receiver system.

BACKGROUND OF THE INVENTION

In a high-speed data communication application, transmitted data may be modulated into a multi-dimensional bit stream format. In each dimension of the bit stream, a bit pattern for a symbol may be transmitted through one wire or one pair of wires. For example, in the situation where there are four pairs of wires at the transmission side, a number or a symbol represented by one 8-bit data may be coded into four couples of sub-symbols, each one representing an integer from −2, −1, 0, 1, and 2, and each one to be sent through one pair of wires. These four couples of sub-symbols are now representing the one symbol that was originally represented by the two 8-bit data.

At the receiving side, the four couples of sub-symbols will need to be decoded back to the original 8-bit format. However in a high-speed data communication system, these four pairs of sub-symbols may go through different wire delays and may therefore arrive at different clock cycles at a receiver system. Also, the four pairs of wires may be transposed in a transmission channel, causing some pairs of sub-symbols to be swapped.

A receiver system usually processes the bit stream in several stages, including a front-end signal processing stage and a decoding stage. At the front-end signal processing stage, the bit patterns are typically processed one dimension at a time. The results are then forwarded to the decoding stage. A conventional Viterbi decoder typically handles the decoding stage. However, the Viterbi decoder usually requires that the bit patterns in different dimensions be well aligned for the same symbol and the pair-swaps be reordered. This adds complexity to the design of the decoder stage in a receiver system.

Moreover, symbol alignment and pair-swap reordering operations typically require the use of many data buffers. Digital first-in-first-out buffers ("FIFO") have been used for symbol level data synchronization. However, when multiple pairs of wires are involved, the conventional FIFO structure becomes too simple for the reordering of the pairs of wires, and it cannot perform pair-swap reordering and symbol alignment at the same time. To solve the problem, many FIFO's may operate in parallel to buffer the data. Since the FIFO's are power-hungry and area-consuming components, using many FIFO's for the symbol alignment and pair-swap reordering operations in the receiver system becomes undesirably space demanding and power consuming.

SUMMARY OF THE INVENTION

The apparatus and method of present invention operates to receive and process a multi-dimensional signal transmitted through a communication channel. The apparatus includes a slicer/encoder coupled to a pair-swap and symbol alignment module that outputs to a decoder. The encoder operates with the slicer, and uses a coding method that reduces the number of bits associated with each symbol in the multidimensional signal as required to be passed through the pair-swap and symbol alignment module to the second decoder, while preserving the detailed code distance information. The pair-swap and symbol alignment module detects and corrects pair-swap and symbol misalignment in the multidimensional signal. The decoder includes a first decoder and a second decoder. The first decoder operates to reverse the encoding done on the multidimensional signal by the encoder. The second decoder operates to correct errors occurred in the multidimensional signal during its transmission in the communication channel.

With the coding method, very compact yet sufficient information is passed through the pair-swap and symbol alignment module to the second decoder. Thus, the number of flip-flops in the pair-swap and symbol alignment module can be significantly reduced because of the reduced number of bits for each symbol. Furthermore, the pair-swap and symbol alignment module performs symbol alignment and pair-swap reordering in one pass, and uses very high degree of serialization to further reduce the total number of flip-flops required. Therefore, power consumption and size of circuitry are significantly reduced.

DETAILED DESCRIPTION OF THE INVENTION

Figure 1:
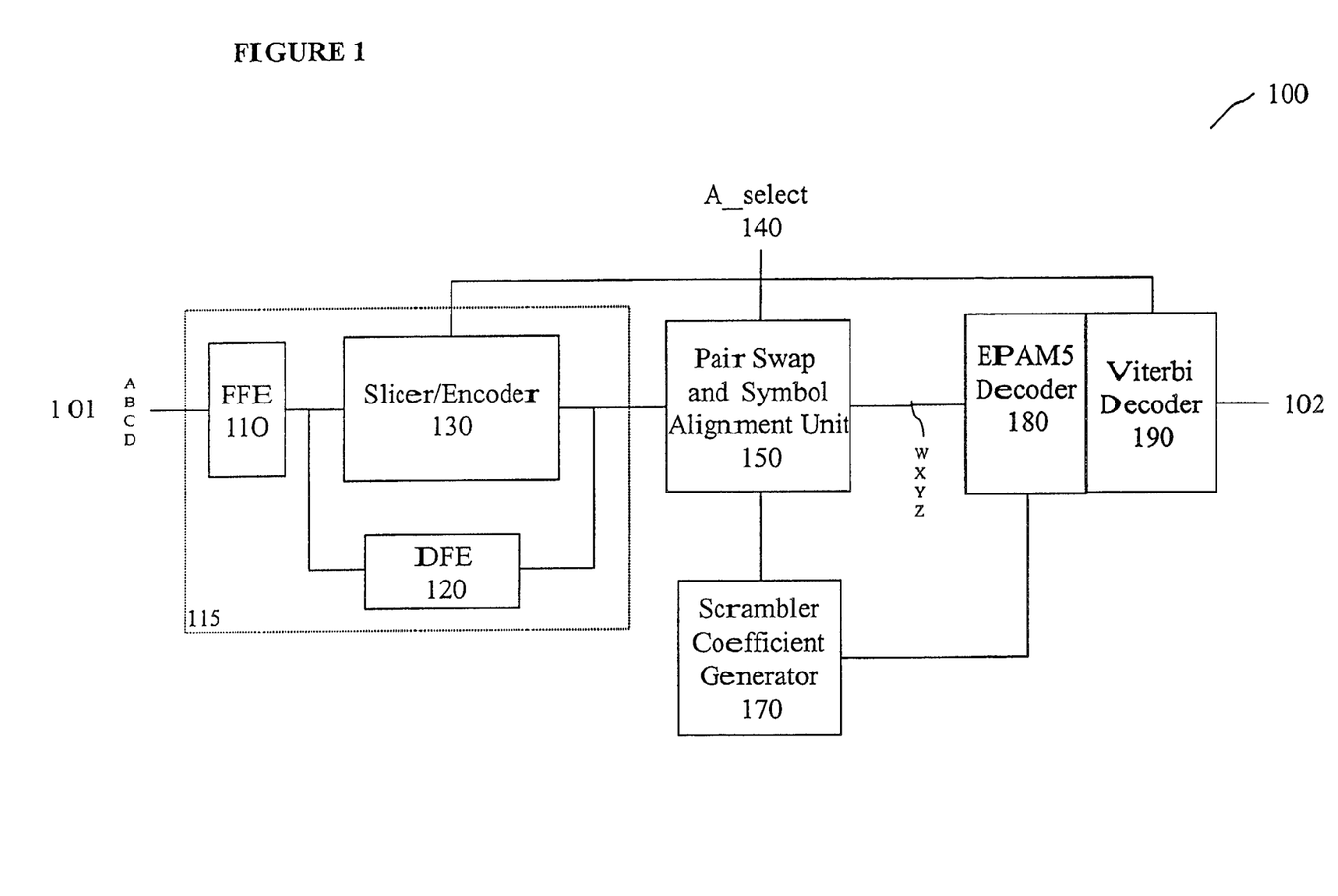
FIG. 1 is a block diagram of a digital receiver system in accordance with an embodiment of the present invention.

FIG. 1 is a schematic block diagram of a digital receiver system 100 for receiving and processing a digital signal 101 transmitted through a communication channel (not shown), in accordance with an embodiment of the present invention. In one embodiment of the present invention, the digital signal 101 is a multi-dimensional bit stream coming through 4 pairs of wires, which are wire-pairs A, B, C, and D. The digital signal 101 include a non-data part, {An[0], Bn[0], Cn[0], Dn[0]}, and a data part, {An, Bn, Cn, Dn}. The non-data part arrives before the data part and is used by the digital receiver system 100 to detect and correct any pair-swap or alignment skew in the four pairs of wires before connection with the data part of the input signal is established. The digital receiver system 100 includes a channel equalizer 115 for minimizing the effect of channel distortion on the digital signal 101. The channel equalizer 115 further includes a feed-forward equalizer ("FFE") 110, a decision feedback equalizer ("DFE") 120, and a slicer/encoder 130. The slicer/encoder 130 quantizes the input signal 101 on each wire or pair of wires to a modulation format. One example of such a modulation format is the pulse amplitude modulation (PAM) format, such as PAM5, in which the signal on each wire or pair of wire is modulated into five levels, such as 2, 1, 0, −1, and −2. Digital data associated with a sub-symbol in a modulation format, such as PAM5, typically does not carry any distance or neighborhood information as later described herein with reference to FIG. 2, and is therefore too concise for a Viterbi decoder to use for its decoding purposes. Therefore, in one embodiment of the present invention, the slicer/encoder 110 also encodes the modulated data and the neighborhood information for each sub-symbol into a 5-bit encoded pulse amplitude modulated format ("EPAM5"), so that very compact yet sufficient information will be carried through subsequent processing steps.

The receiver system 100 further includes a pair-swap and symbol alignment module 150 that receives the sliced and encoded data from the slicer unit 130, and performs pair-swap reordering and symbol alignment operation on the received data. The receiver system 100 further includes a decoder comprising an EPAM5 decoder 180 and a Viterbi decoder 190 coupled to the EPAM5 decoder 180. The EPAM5 decoder decodes data in EPAM5 format to recover the neighborhood information for each sub-symbol and expands the 5 bits encoded data for each sub-symbol into a 9-bit format for Viterbi decoding. The Viterbi decoder 190 corrects any errors such as noise caused by the communication channel in the decoded data from the EPAM5 decoder 180, and produce an output signal 102 of the digital receiver system, which are in the 8-bit format for each symbol. After going through the pair-swap and symbol alignment module 150, the encoded sub-symbols in the four pairs of wires are aligned and any pair-swaps in the four pairs of wires are reordered. The symbols are then sent to the EPAM5 decoder 180 through 4 ordered data lines in the order of line W, line X, line V, and line Z.

The receiver system 100 operates compatibly with conventional protocols and includes a scrambler coefficient generator 170 for providing the pair swap and symbol alignment unit 150 with coefficients required by the pair-swap reordering and symbol alignment operation. The scrambler coefficient generator 170 uses the non-data part of the input signal in the first wire-pair, wire-pair A as a random sequence generator to log on a seed transmitted from a transmission side. The seed is then used to generate a set of scrambler coefficients, Scn[3:0], which will be used to compare with the non-data part of the input signal 101 in wire-pairs B, C, and D, for the purpose of detecting pair-swap and symbol misalignment. The scrambler coefficients, Scn[3:0], are synchronized with wire-pair A, so that any misalignment detected will be with respect to the symbols in wire-pair A. The A-select input is provided from an analog front-end circuit (not shown), and a control unit (not shown) synchronizes and controls the operation of the different units in the digital receiver system 100 in the manner as later described herein.

Figure 2:
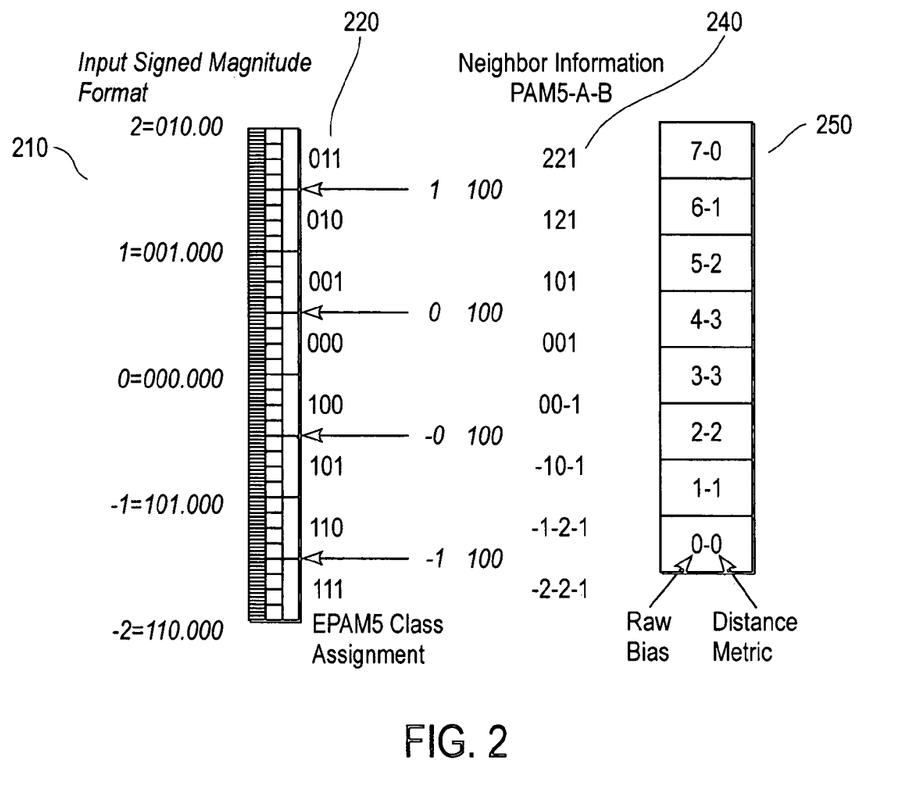
FIG. 2 is a block diagram that illustrates the encoding method used by the Encoder.

Reference is now made to FIG. 2 to describe a method used by the slicer/encoder 130 to encode the digital signal 101 into EPAM5 format, in accordance with one embodiment of the present invention. The input to the slicer/encoder 130 may be some fixed-point format and the slicer directory converts the signal into the EPAM5 format FIG. 2 shows EPAM5 and conventional F3.3 format characteristics. The slicer/encoder 130 extracts the sign bit, the second magnitude bit, and the first fractional bit as the content that will be used to decide to which signal level the data belongs. The raw distance information for the Viterbi decoder 190 is in the 3 fractional bits. The slicer/encoder further employs a set of EPAM5 class assignment 220 and a distance metric 250 corresponding to the raw bias information for the PAM5 output. The class assignment 220 and the distance metric 250 are used to encode the PAM5 output and the corresponding neighborhood information, as shown in the PAM5-A-B column 240, into five bits. If the input data in the F3.3 format is greater than 2, then the encoding method automatically generates 011 for the EPAM5 class assignment 220. The first digit of each of the numbers in the PAM5-A-B column represents the PAM5 output from the slicer unit 130. The digits in the A and B columns represents the neighbors in the A class and the B class, respectively, (i.e., signal levels of {2, 0, −2} is the "A" class, and signal levels of {1, −1} is the "B" class). The PAM5-A-B neighborhood information will be extracted at the EPAM 5 decoder 180.

The Slicer Encoder 130 extracts the sign bit, the second magnitude bit, and the factional bits and encode these bits into the EPAM5 format. These 5 bits can carry the PAM5 information, the neighbor information and the distance metric information for the Viterbi decoding performed later by the Viterbi decoder 190. Table 1 lists a few examples of how data associated with a sub-symbol in F3.3 format is converted to EPAM5 format.

TABLE 1

Examples of EPAM5 Encoding

| F3.3 | Class Assignment | PAM5-A-B | Distance Metric | EPAM5 |
| --- | --- | --- | --- | --- |
| 001.101 | 001 | 2 2 1 | 101 | 01101 |
| 010.100 | 010 | 2 2 1 | 100 | 00100 |
| 100.010 | 100 | −2 −2 −1 | 010 | 10010 |
| 110.001 | 110 | −2 −2 −1 | 001 | 10001 |

Figure 3:
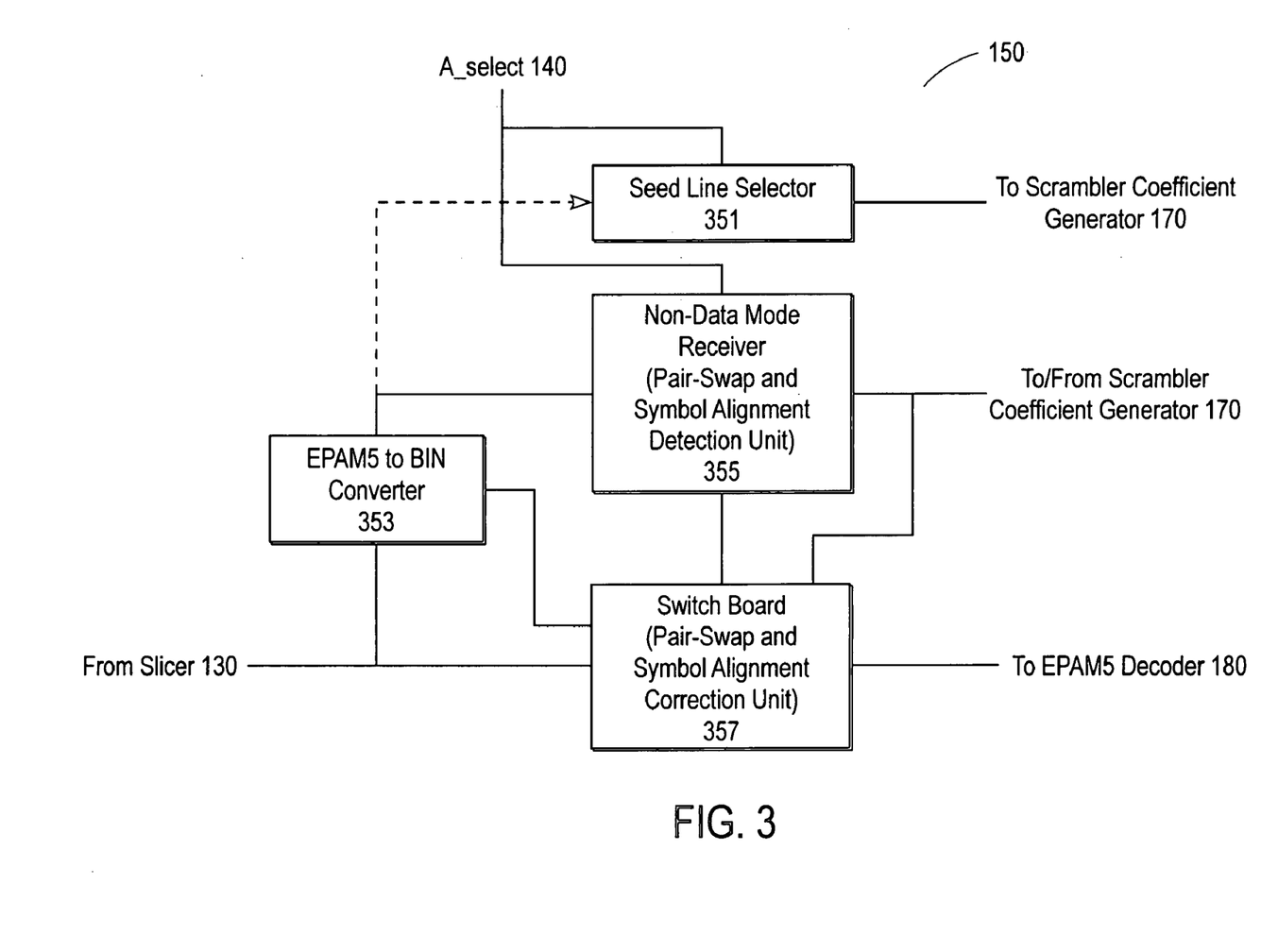
FIG. 3 is a block diagram of a pair-swap and symbol alignment module in the digital receiver system in accordance with an embodiment of the present invention.

Referring now to FIG. 3, there is shown a block diagram of the pair-swap and symbol alignment module 150 in the digital receiver system 100 of FIG. 1, in accordance of an embodiment of the present invention. The pair-swap and symbol alignment module 150 takes the encoded signal from the slicer/encoder 130 as input and performs pair-swap reordering and symbol alignment on the encoded signal before outputting the signal to the EPAM5 decoder 180. The pair-swap and symbol alignment module 150 includes a non-data mode receiver or a pair-swap and symbol alignment detection unit 355 that receives the non-data part of the input signal 101 and detects pair-swap and alignment skew in the input signal 101. The pair-swap and symbol alignment module 150 further includes a switchboard or pair-swap and symbol alignment adjustment unit 357 that is coupled to the non-data mode receiver 355. The switchboard 357 performs the operation of symbol alignment and pair-swap reordering on the encoded signal before verifying that the pair-swap and symbol alignment skew detected by the non-data mode receiver 355 are correct. The pair-swap and symbol alignment module 150 further includes an EPAM5-to-binary converter 353 that is coupled to the non-data mode receiver 355 and the switchboard 357. The EPAM5-to-binary converter 353 converts the non-data part of the encoded signal to a binary format for pair-swap and symbol alignment detection and verification purposes. The pair-swap and symbol alignment module 150 further includes a geed line selector 351 for selecting the seed line which is used as a reference for pair-swap and symbol alignment adjustment.

Figure 4A:
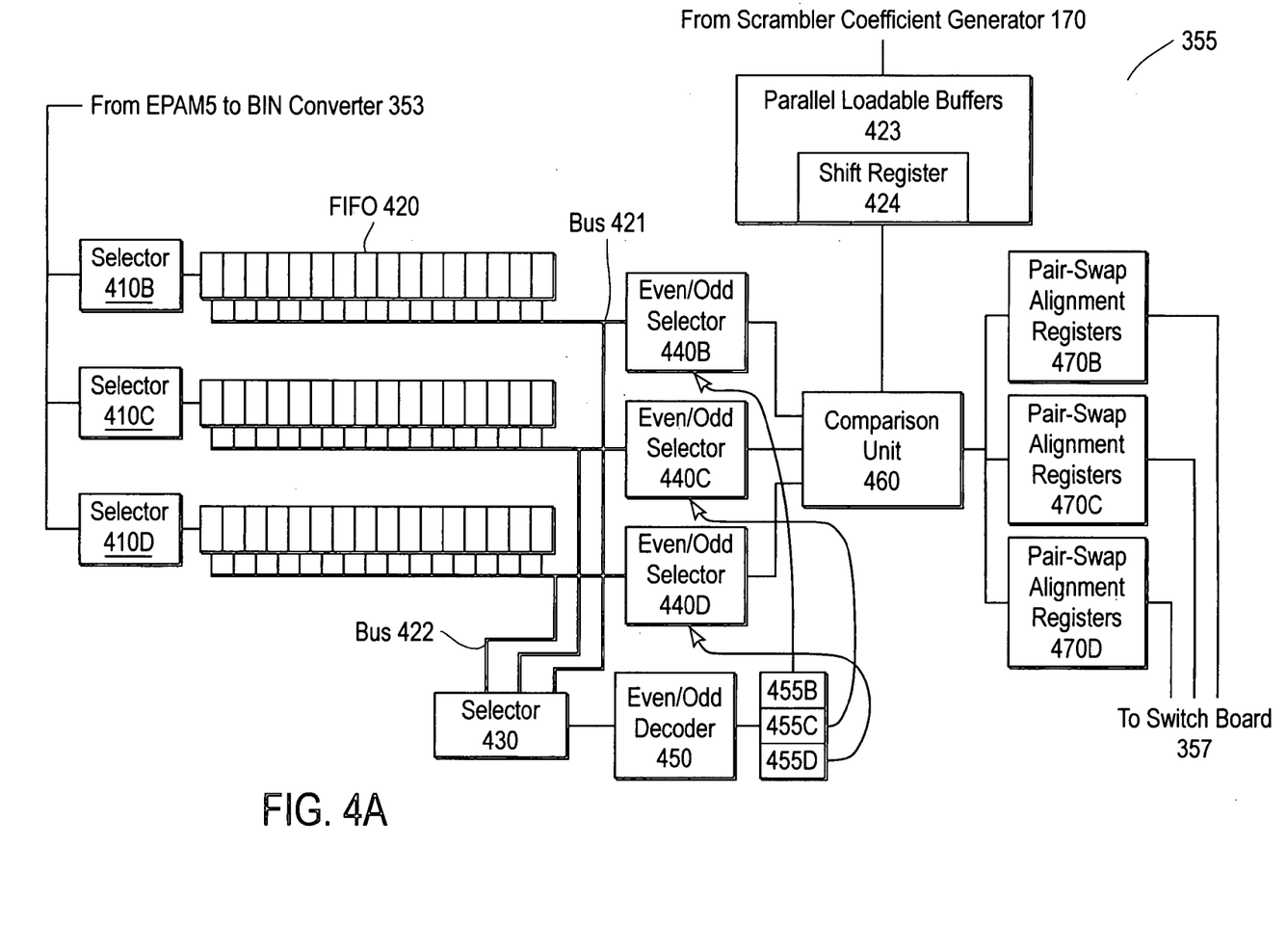
FIG. 4A is a block diagram of a non-data mode receiver in the symbol alignment module in accordance with an embodiment of the present invention.

Referring now to FIG. 4, there is shown a block diagram of the non-data mode receiver 355, in accordance with an embodiment of the present invention. The non-data mode receiver 355 includes three FIFO buffers 420 for loading binary data from the EPAM5-to-binary converter 353, and a set of parallel loadable buffers 423 that parallely loads the scrambler coefficients from the scrambler coefficient generator 170 and serially shifts the loaded scrambler coefficients through shift register 424 for comparison with selected binary data from the three sets of FIFO buffers 420. The non-data mode receiver 355 further includes three selecting devices (or selectors), 410B, 410C, and 410D. Selector 410B is configured to select from the output of the EPAM5-to-binary converter 353 data associated with wire-pair B; selector 410C is configured to select from the output of the EPAM5-to-binary converter 353 data associated with wire-pair C; and selector 410D is configured to select from the output of the EPAM5-to-binary converter 353 data associated with wire-pair D. The non-data mode receiver 355 further includes a comparison unit 460 configured to compare selected data from the FIFO buffers 420 with a set of scrambler coefficients from the parallel loadable buffers 423. The comparison unit 460 makes use of three pair-swap and symbol alignment registers 4761, 470C, and 470D for locking in the pair-swap and symbol alignment skew detected for the wire-pairs B, C, and D, respectively.

In one application of the present invention, each of the FIFO buffers 420 is 16 bits in size, and every other bit from each FIFO buffer 420 is selected to fit an 8-bit format required by the Gigabit protocol (IEEE 802.3ab standard). For this application, the non-data mode receiver 355 further includes three even/odd selectors 440B, 440C, and 440D, each for selecting from one of the FIFO buffers 420 every other bit of data with even or odd time stamps for comparison. Therefore, the even/odd selector 440B, 440C, or 440D sends two sets of data separately to the comparison unit 460 for comparison with the scrambler coefficients, one set of data having even time stamp, one get of data having odd time stamp. The even/odd selectors 440B–D make use of an even/odd decoder 450 for determining the even or odd feature of each set of data. The even/odd decoder 450 determines the even or odd feature of each set of data from one FIFO buffer 420 at a time, and therefore makes use of a selecting device 430 that selects data sent through one of the three data buses 423. The even/odd decoder 450 also makes use of three even/odd registers 455B, 455C, and 455D for locking in the even/odd features determined for the data from the three FIFO buffers 420, respectively. The non-data mode receiver 355 further includes three data buses 421 coupled to the three FIFO buffers 420, respectively, for transporting data from the FIFO buffers 420 to the three even/odd selectors 440B, 440C, and 440D, respectively. The non-data mode receiver 355 further includes three other data buses 422 that are connected to the three data buses 421, respectively. The three buses 422 transport data from the FIFO buffers 420 to the even/odd decoder 450. (In other applications, the even/odd selectors 440B–D, the even/odd decoder 450, the selector 430, the data buses 422 and the even/odd registers are not required. Data may be directly taken from the FIFO buffers 420 to the comparison unit 460 for comparison with the scrambler coefficients.)

Figure 4B:
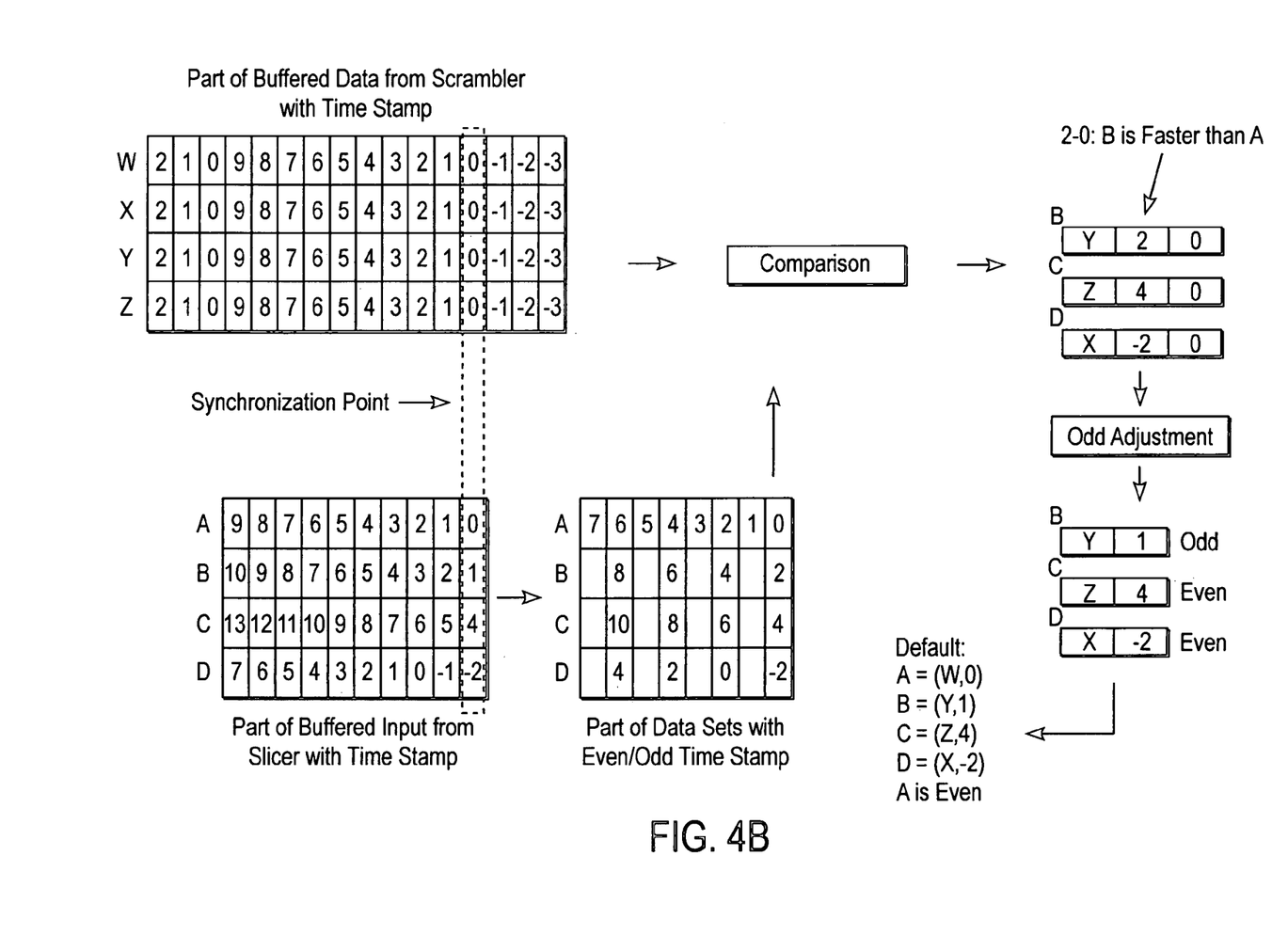
FIG. 4B is a flow chart illustrating a process for symbol alignment and pair-swap detection in the non-data mode receiver in accordance with an embodiment of the present invention.

Reference are now made to FIGS. 4A and 4B to describe the operation of the non-data mode receiver. The receiver receives four pairs of data coming ion wire-pairs A, B, C, and D. Based on the output of the seed line selector 351, as shown in FIG. 3 the non-data mode receiver 355 selects data from wire-pair A as reference for alignment. Then data from the other three pairs of wires are loaded into the three FIFO buffers 420, respectively, at the same time. The scrambler coefficients, Scn[3:0], are parallelly loaded into the parallel loadable buffers 423. The parallel loadable buffers includes a shift register 424 that serially shifts the coefficients to the comparison unit 460. 8 bits of coefficient data are pulled out to the comparison unit 460 at a time.

The comparison unit 460 uses the 8 bits of coefficient data to compare with an 8-bit set of data with even or odd time stamp from each of the three FIFO buffers 420. Once there is a match, it is considered as a hit. This is done for data associated with each of the three different pairs of wires loaded in the FIFO buffers 420, in order to find the pair-swap and alignment information for the three wires. The comparison is done in a serial manner, i.e., first data associated with wire-pair B is taken for comparison, then wire-pair C, and then wire-pair D. Therefore, the comparison for all three wire-pairs are broken into three cycles. Once there is a hit, meaning that a set of data with even/odd time stamp associated with one of the three wire-pairs B, C, or D match the 4-bit scrambler coefficient, the pair-swap and symbol alignment information is recorded in the respective pair-swap and alignment registers, 470B, 470C, or 470D. Until a match is found for every one of the three pairs of wires, this process is repeated every three cycles, i.e., the scrambler coefficients are shifted by one bit every three cycles for comparison with data from the three wire-pairs. When the pair-swap and symbol alignment information is found for all of the three pairs of wires, the even/odd feature of each set of data that matched the scrambler coefficients is checked, and if it is different from the even/odd feature of wire-pair A, adjustment is made. As an example, the final pair-swap and symbol alignment information for wire-pairs B, C, and D may be, respectively, B=(Y, 2), meaning that B is ahead of A by two time stamps and should be switched to line Y, C=(Z, 4), meaning that C is ahead of A by 4 cycles and should be switched to line Z, and D=(X, −2), meaning that D is delayed in respect to A by 2 cycles and should be switched to line X.

By loading the scrambler coefficients parallelly and by shifting them serially, the comparisons are done in a serial manner, and the comparison unit 460 is shared by the data from three pairs of wires. This serialization helps to reduce power consumption and size of hardware implementation because less circuitry is operated at the same time.

Figure 4C:
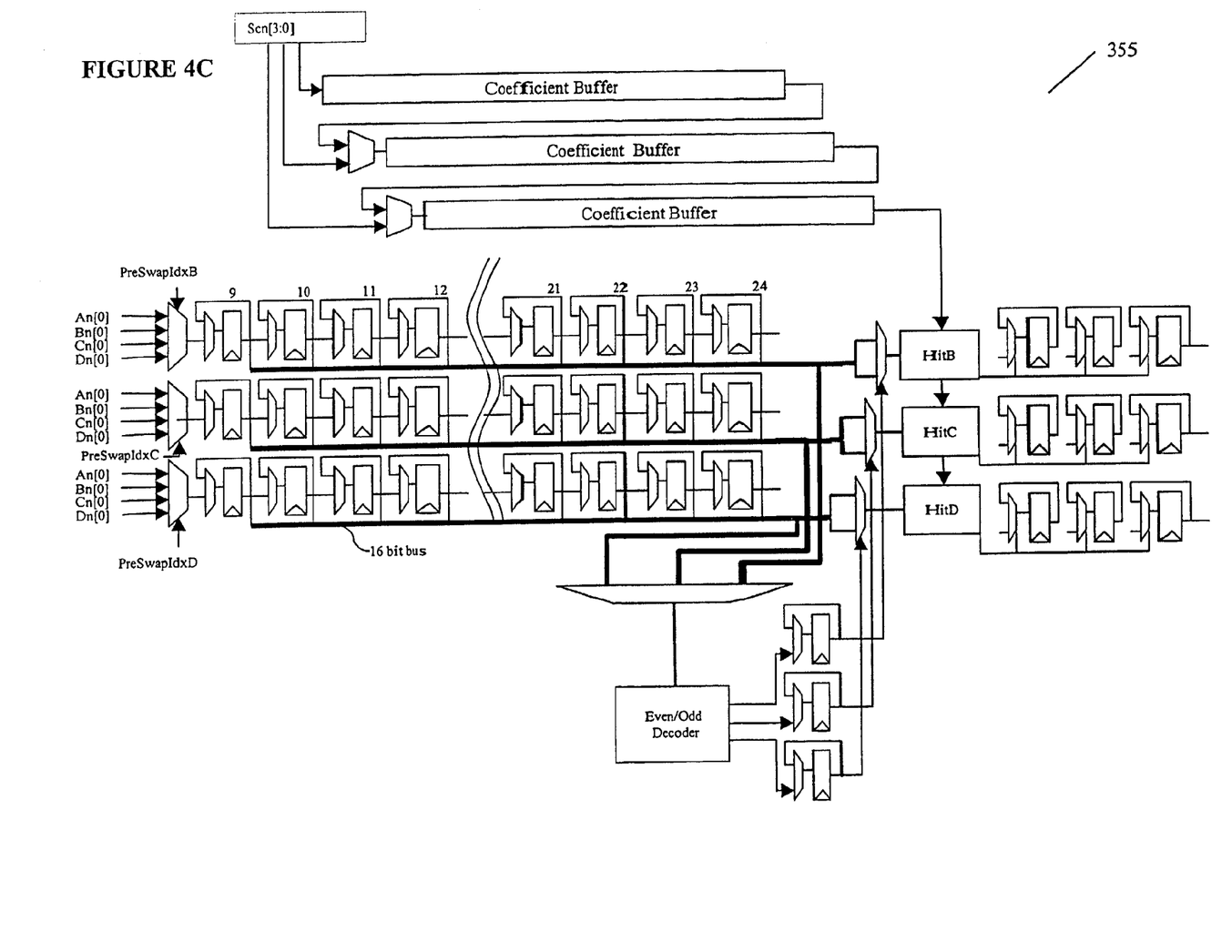
FIG. 4C is a circuit schematic of a hardware implementation of the non-data mode receiver in accordance with an embodiment of the present invention.

FIG. 4C is a circuit schematic illustrating a hardware implementation of one embodiment of the non-data mode receiver 355 for operating in the manner as described previously herein with reference to FIG. 4A.

Figure 5A:
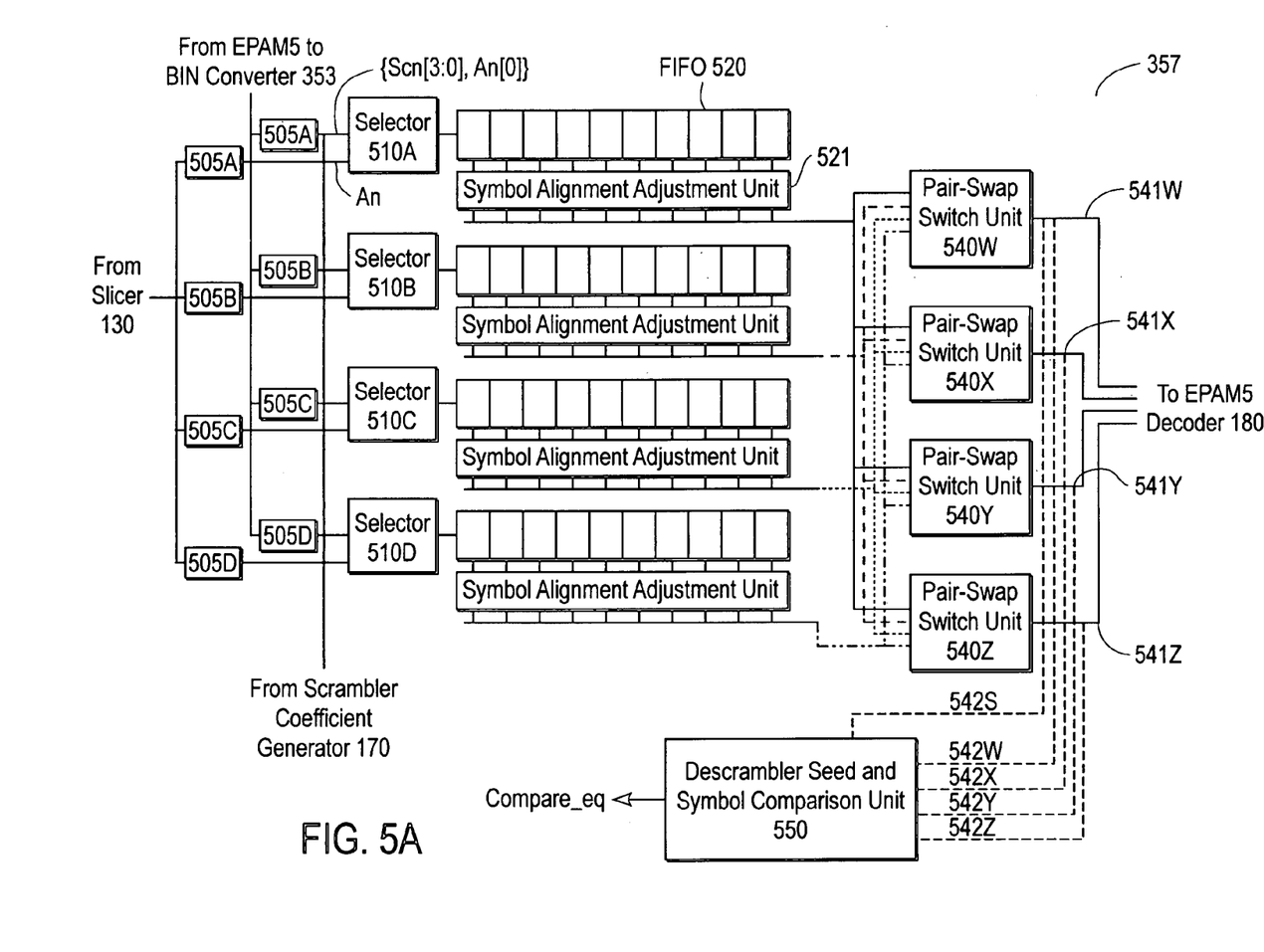
FIG. 5A is a block diagram of a switchboard for pair-swap and symbol alignment adjustment in the pair-swap and symbol alignment module in accordance with an embodiment of the present invention.
Figure 5B:
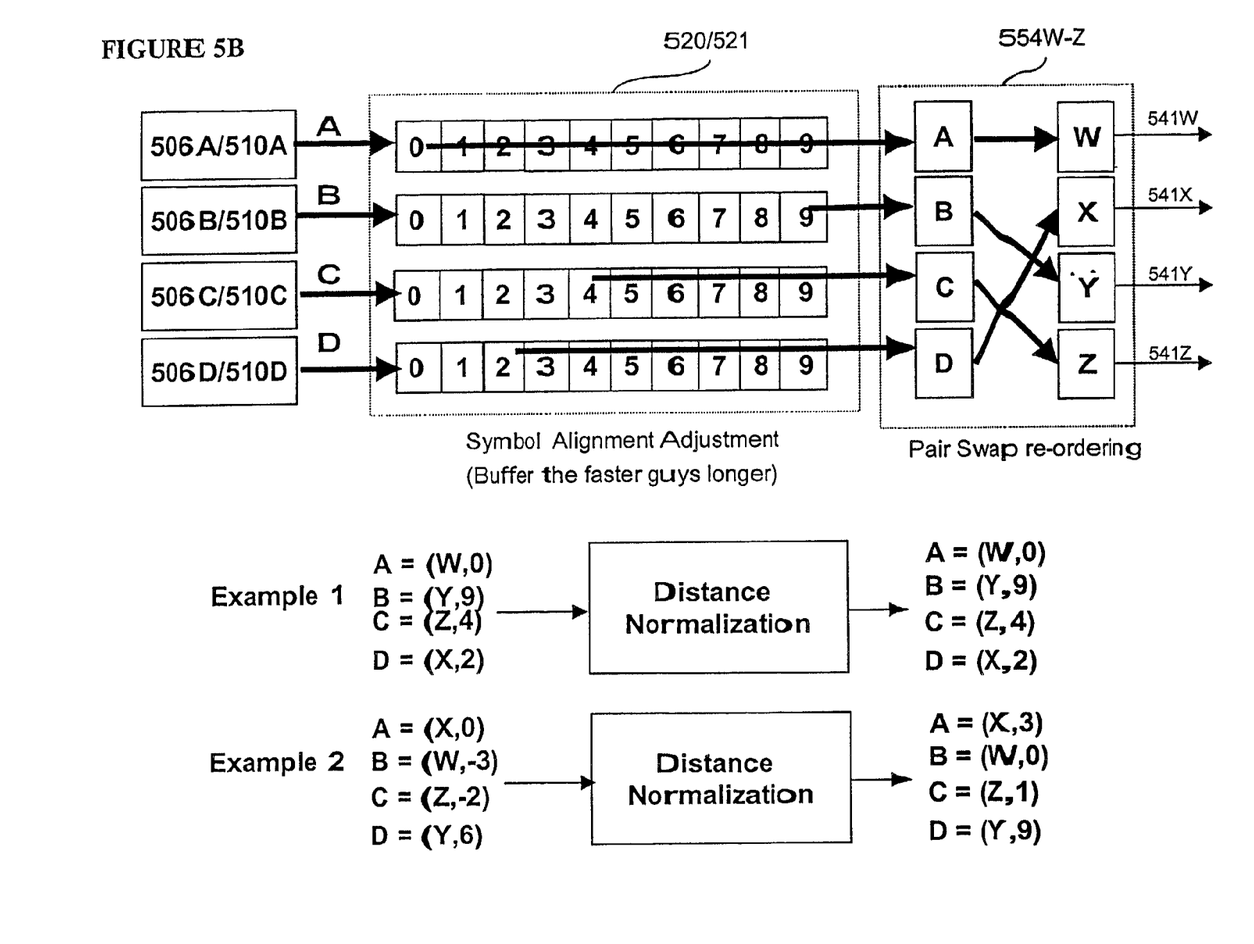
FIG. 5B is a block diagram illustrating an example of a pair-swap reordering and symbol alignment operation performed by the switchboard in accordance with an embodiment of the present invention.

Reference is now made to FIG. 5A and FIG. 5B to describe the operation of the switchboard 357, in accordance with an embodiment of the present invention. Once the pair-swap and symbol alignment information is found, Data from the slicer/encoder is sent to the switchboard 357 that reorders the swapped pairs and realign the symbols in the four pairs of wires. As shown in FIG. 5A, the switchboard includes four FIFO buffers 520, and four symbol alignment adjustment units 521 attached to the four FIFO buffers, respectively. The four symbol alignment adjustment units 521 are connected to the non-data mode receiver 355 (connection not shown), receive the symbol alignment information detected by the non-data mode receiver 355, and use that information to adjust the alignment of the symbols carried by the four pair of wires. The switchboard also includes four pair-swap switching units 540W, 540X, 540Y, and 540Z, each one is coupled to the four symbol alignment adjustment units 521. The four pair-swap switching units 540W–Z are connected to the non-data mode receiver 355 (connection not shown), receive the pair-swap information detected by the non-data mode receiver 355, and use that information to re-order data from the four pairs of wires.

Still referring to FIG. 5A, in one embodiment of the present invention, the switchboard 357 also functions to verify the correctness of the pair-swap and symbol alignment information detected by the non-data mode receiver 355. Therefore, the switchboard 357 also includes four selectors 510A, 510B, 510C, and 510D for selecting between the data part and a combination of the scrambler coefficient and the non-data part of the input signal associated with wire-pairs A, B, C, and D, respectively. Each selector of the four selectors 510A, 510B, 510C, and 510D outputs to a different one of the four FIFO buffers 510. The switchboard 357 further includes a second set of four selecting devices 506A, 506B, 506C, and 506D, coupled to the selectors 510A, 510B, 510C, and 510D, respectively. The selector 506A selects from the output of the slicer/encoder 130 data associated with wire-pair A; the selector 506B selects from the output of the slicer/encoder 130 data associated with wire-pair B; the selector 506C selects from the output of the slicer/encoder 130 data associated with wire-pair C; and the selector 506D selects from the output of the slicer/encoder 130 data associated with wire-pair D. The switchboard 357 further includes a third set of four selecting devices 505A, 505B, 505C, and 505D, coupled to the selectors 510A, 510B, 510C, and 510D, respectively. The selector 505A selects from the output of the EPAM5-to-binary converter 353 data associated with wire-pair A; the selector 505B selects from the output of the EPAM5-to-binary converter 353 data associated with wire-pair B; the selector 505C selects from the EPAM5-to-binary converter 353 data associated with wire-pair C; and the selector 505D selects from the output of the EPAM5-to-binary converter 353 data associated with wire-pair D. The switchboard further includes a descrambler seed and symbol comparison unit 550 that performs the operation of comparing the symbol aligned and pair-swap reordered data with the scrambler coefficients.

The FIFO buffers 520 can be implemented by a series of flip-flops. In one embodiment of the present invention, each flip-flop is 5-bits in size for holding one EPAM5 encoded sub-symbol. The number of flip-flops in each of the FIFO buffers 520 is flexible and can be adjusted according to the needs of particular applications.

The switchboard 357 operates in a verification mode and in a switching mode. In the verification mode, binary data associated with the non-data part of the input signal for four wire-pairs are loaded into the four FIFO buffers 520, respectively. At the same time, scrambler coefficients from the different scrambler coefficient generator 170 are also loaded in the four FIFO buffers. Each of the 5-bit flip-flops holds one bit of data and four bits of scrambler coefficients. The symbol alignment adjustment units 521 aligns the data by buffering the faster data longer and by jumping the slower data in respect to data from wire A, based on the pair-swap and symbol alignment information received from the non-data mode receiver. The scrambler coefficients and the aligned data are sent to each of the pair-swap switch units 540W–Z. The pair-swap switch unit 540W selects from the data associated with the four wire-pairs data associated with wire-pair A and sends the data down line 542W to the descrambler seed and symbol comparison unit 550; the pair-swap switch unit 540X selects from the data associated with the four wire-pairs data that should be switched to line X and sends the data down line 542X to the descrambler seed and symbol comparison unit 550; the pair-swap switch unit 540Y selects from the data associated with the four wire-pairs data that should be switched to line Y and sends the data down line 542Y to the descrambler seed and symbol comparison unit 550; the pair-swap switch unit 540Z selects from the data associated with the four wire-pairs data that should be switched to line Z and sends the data down line 542Z to the descrambler seed and symbol comparison unit 550. The scrambler coefficients are transported to the descrambler seed and symbol comparison unit 550 through line 542S. The descrambler seed and symbol comparison unit compares the scrambler coefficients with the pair-swap reordered and symbol aligned data for a selected number of cycles. If an error is found, meaning there is a mismatch during these selected number of cycles, the PCS control unit will reload the non-data mode receiver to start the operation of pair-swap and symbol alignment detection again. If there is no error during the selected number of cycles, the switchboard 357 starts to operate in the switching mode.

Reference is now made to FIGS. 5A and 5B to describe the operation of the switchboard in the switching mode. In the switching mode, the switchboard takes as inputs the data part of the EPAM5 encoded data of the input signal from the slicer/encoder 130. After going through selectors 506A–D and 510A–D, data associated with wire-pairs A–D are loaded in the four FIFO buffers 520 respectively. Data corresponding to each sub-symbol, which is 5-bits in size because of EPAM5 encoding, occupies one 5-bit flip-flop in the FIFO buffers 520. The symbol alignment adjustment units 521 aligns the sub-symbols by buffering the faster sub-symbols longer and by jumping the slower sub-symbols through the FIFO buffers quicker in respect to data from wire A, based on the pair-swap and symbol alignment information received from the non-data mode receiver. The aligned sub-symbols associated with all four pairs of wires are sent to each of the pair-swap switch units 540W–Z. The pair-swap switch unit 540W selects from the sub-symbols associated with the four wire-pairs sub-symbols associated with wire-pair A and send the sub-symbols down line 541W to the EPAM5 decoder 180; the pair-swap switch unit 540X selects from the sub-symbols associated with the four wire-pairs sub-symbols that should be switched to line X and sends the sub-symbols down line 541X to the EPAM5 decoder 180; the pair-swap switch unit 540Y selects from the sub-symbols associated with the four wire-pairs sub-symbols that should be switched to line Y and sends the sub-symbols down line 541Y to the EPAM5 decoder 180; the pair-swap switch unit 540Z selects from the sub-symbols associated with the four wire-pairs sub-symbols that should be switched to line Z and sends the sub-symbols down line 541Z to the EPAM5 decoder 180.

In this manner, the switchboard performs symbol alignment and pair-swap reordering on data from the four pairs of wires in one pass. Referring back to FIG. 1, the aligned and pair-swap reordered sub-symbols associated with the four pairs of wires arriving at the EPAM5 decoder 180 are EPAM5 encoded and are 5 bits per each sub-symbol. The Encoder expands the 5 bits per sub-symbol to a 9-bit format including neighborhood information for application to the Viterbi decoder 190. By using the EPAM5 encoding, 5 bits instead of 9 bits per sub-symbol are passed through the pair-swap and symbol alignment module 150, and the FIFO buffers 520 in the switchboard 357 can be made much smaller. Therefore, power consumption and hardware space for the digital receiver 100 are significantly reduced in accordance with the present invention.

We claim:

1. In a digital signal receiver for a communication system, a method for processing a multi-dimensional digital signal received from a communication channel, the multidimensional signal including encoded data symbols, each encoded data symbol being represented by a number of sub-symbols in different dimensions of the multi-dimensional signal, the method comprising:

encoding each sub-symbol in the multidimensional signal by extracting information including the quantized value and neighborhood information associated with the sub-symbol for subsequent processing;

performing a pair-swap and symbol alignment operation on the encoded multidimensional signal; and decoding the pair-swap reordered and symbol aligned multidimensional signal to produce data symbols represented by the sub-symbols in an output signal.

2. A digital signal receiver for reordering a multi-dimensional signal received from a communication channel, the multidimensional signal including encoded data symbols, each encoded data symbol being represented by a number of sub-symbols in different dimensions of the multi-dimensional signal, comprising:

a slicer configured to quantize the sub-symbols in the multidimensional digital signal to a quantized value, wherein each sub-symbol before the slicer is represented by one sign bit, a first and a second magnitude bits and three fractional bits;

an encoder operating in conjunction with the slicer and configured to encode each sub-symbol to include the quantized value and neighborhood information associated with each sub-symbol by extracting the sign bit, the second magnitude bit, and the three fractional bits to represent the encoded sub-symbol;

a pair-swap and symbol alignment module coupled to the slicer/encoder and configured to detect and correct pair-swap and symbol misalignment in the multidimensional digital digital; and at least one decoder coupled to the pair-swap and symbol alignment module configured to receive the pair-swap reordered and symbol aligned multidimensional signal, to decode the sub-symbols in the multidimensional signal, to correct errors associated with these sub-symbols, and to produce decoded symbols represented by the sub-symbols in an output signal.

3. A digital signal receiver for reordering a multi-dimensional signal received from a communication channel, the multidimensional signal including a data part and a non-data part preceding the data part, and including encoded data symbols, each represented by a number of sub-symbols in different dimensions of the multi-dimensional signal, comprising:

a slicer configured to quantize the sub-symbols in the multidimensional digital signal to a quantized value;

an encoder operating in conjunction with the slicer unit and configured to encode each sub-symbol to include the quantized value and neighborhood information associated with the sub-symbol;

a pair-swap and symbol alignment module coupled to the slicer/encoder and configured to detect and correct pair-swap and symbol misalignment in the multidimensional digital digital, the pair-swap and symbol alignment module including a converter to convert each encoded sub-symbol in the non-data part of the multi-dimensional signal into binary format and including a non-data mode receiver coupled to the converter to detect pair swap and symbol misalignment in the multidimensional signal using the non-data part of the multidimensional signal in binary form as received from the converter, and including a switchboard module coupled to the non-data mode receiver configured to correct pair-swap and symbol misalignment in the multidimensional signal based on information regarding pair-swap and symbol misalignment in the multi-dimensional signal as detected by the non-data mode receiver; and at least one decoder coupled to the pair-swap and symbol alignment module configured to receive the pair-swap reordered and symbol aligned multidimensional signal, to decode the sub-symbols in the multidimensional signal, to correct errors associated with these sub-symbols, and to produce decoded symbols represented by the sub-symbols in an output signal.

4. The digital receiver of claim 3, wherein the non-data mode receiver detects pair-swap and symbol misalignment in the multidimensional signal by serially comparing selected bits from each dimension of the non-data part of the multidimensional signal with a set of scrambler coefficients.

5. The digital receiver of claim 3, wherein the switchboard module corrects pair-swap and symbol misalignment in the multidimensional signal by performing symbol alignment and pair-swap reordering operations in one pass.

6. The digital receiver of claim 3, wherein the switchboard module operates in a verification mode and in a switching mode, verifies that information regarding pair-swap and symbol misalignment detected by the non-data mode receiver is correct in the verification mode, and corrects pair-swap and symbol misalignment in the multidimensional signal in the switching mode.

* * * * *